UNITED STATES PATENT OFFICE.

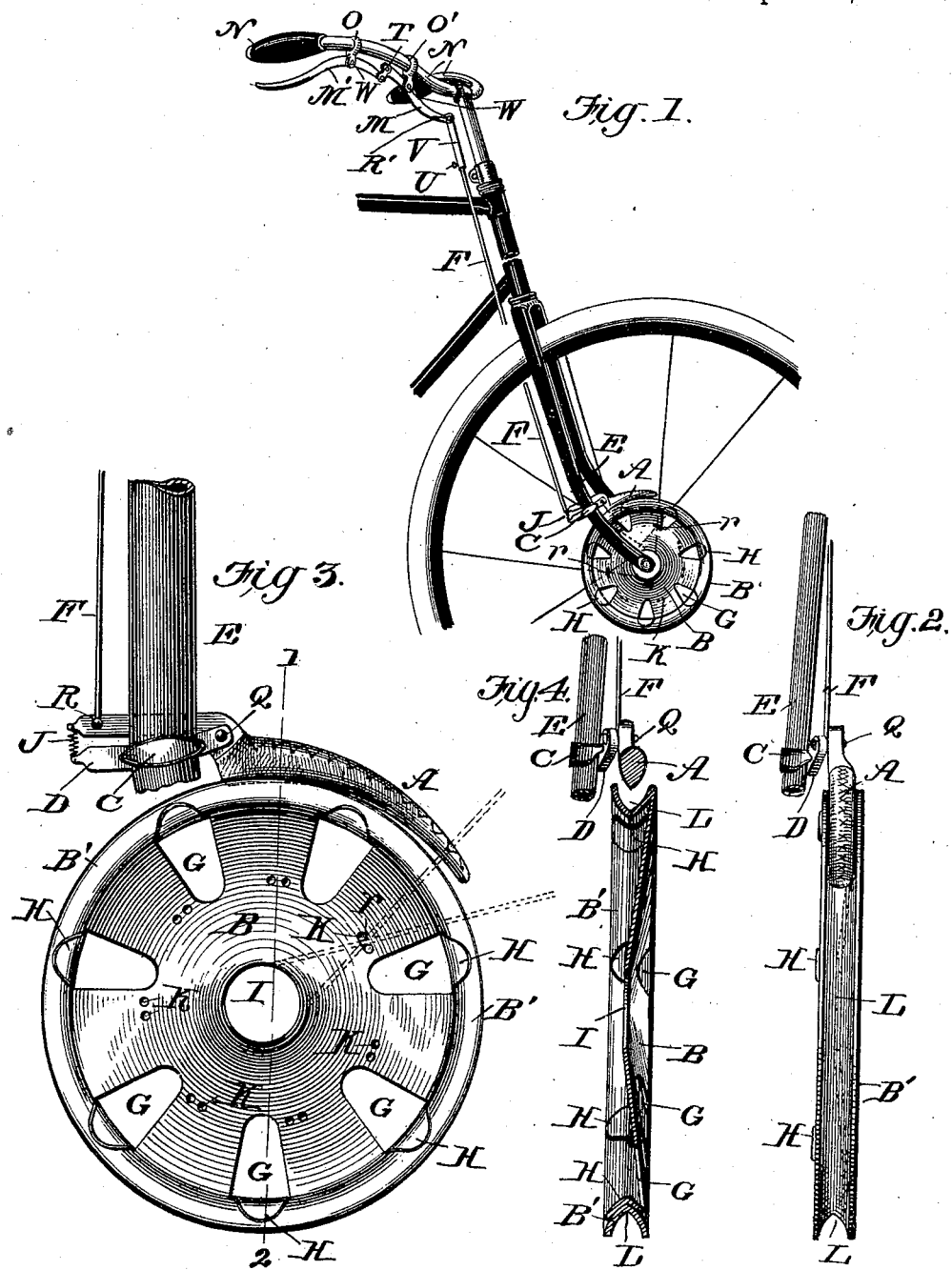

WILLIAM VALENTINE AND WILLIAM S. VALENTINE, OF LEWISTON, CALIFORNIA.

BICYCLE-BRAKE.

SPECIFICATION forming part of Letters Patent No. 581,444, dated April 27, 1897.

Application filed August 17, 1895. Serial No. 559,692. (No model.)

*To all whom it may concern:*

Be it known that we, WILLIAM VALENTINE and WILLIAM S. VALENTINE, of Lewiston, in the county of Trinity and State of California, have invented a new and useful Improvement in Bicycle-Brakes, of which the following is a specification.

Our invention is in the nature of a new and useful bicycle-brake of simple and practical construction, the object of which is to control the bicycle without injury to the tire; and it consists in a grooved disk securely fastened to spokes of the front wheel in a peculiar manner and combined with a lever fitting the groove in the disk and fastened to the fork of the bicycle and operated by a connecting-rod and a compound lever fastened to handle-bar of the bicycle, as hereinafter more fully described with reference to the drawings, in which—

Figure 1 shows in a broken perspective view the application of the brake to the bicycle. Fig. 2 is an enlarged front view of the brake, showing the fastening of the lever to the fork of bicycle. Fig. 3 is a side view on the same scale as Fig. 2, showing the brake attached to the fork of the bicycle and the manner of constructing the grooved disk. Fig. 4 is a cross-section of Fig. 3 along the line 1 2, showing the dished shape or angle of side of the disk as made to conform to the angle of the spokes of the bicycle-wheel, also showing how the cross-section of the lever conforms to the shape of groove in the disk.

Similar letters refer to similar parts throughout the figures.

B is a sheet-metal disk whose central hole I is made to fit one end of the hub or the axle of bicycle-wheel. This disk is not connected to the hub, but has a special attachment hereinafter described. The outer side of the disk B is convex and its inner side concave or dished to fit against the spokes of the side of the bicycle-wheel. In the disk are pairs of holes K, arranged at regular intervals in the side of the disk and so placed as to coincide with the crossings r of the spokes in the wheel. The disk is securely fastened to the bicycle-wheel by putting the disk in place over the axle and passing wire through the holes K and around the spokes at the points where the tangentially-arranged spokes cross each other. The advantage of this mode of connection is that it enables the brake-disk to be conveniently and firmly applied to any bicycle-wheel of this pattern and causes the braking power to be distributed evenly to the spokes all around the wheel at points where their crossing not only permits of convenient attachment by means which will not slip or move, but also at points which represent the braced or trussed points of the wheel, so that no bending of the spokes under the brake strain can occur. Around the periphery of the disk is its grooved rim B', held by tongue-shaped pieces H, cut from the side of disk B and leaving the hole G. The tongues H are bent outwardly to fit the rim which forms the groove to receive the brake-lever.

The brake-lever A is made of a cross-section corresponding to groove L, so as to wedge in the groove, and is fastened to a bar D by a fulcrum-pin Q. The bar D is fastened to the inner side of the section E of the fork of bicycle by the clip C, which passes around the outside of bicycle-fork and through bar D and is held by two nuts on the inner side. (Not shown.)

Lever A is covered with leather or other material to prevent wearing the groove L, which leather is laced on through holes in the top of lever A. Spring J connects the back ends of the lever A and the bar D, which extends back of fork E, and so as to throw off lever A from the disk when not in use. The rod F connects to lever A at the back end by pin R and extends up and into a tubular socket V and connects with compound lever M M' by bolt R. The rod F may be lengthened or shortened by sliding into or out of tube V, being held at the proper place by set-bolt U.

The sections of compound lever M M' are connected by the link T and are fastened to the handle-bars N by the clips O O', which pass around the handle-bars and fasten to lever M M' by bolts W W.

Having thus described our invention, what we claim as new, and desire to secure by Letters Patent, is—

1. The combination with a bicycle-wheel having spokes which cross each other near the hub; of a brake-disk having a frictional periphery, means for attaching the brake-disk to the wheel at the crossed points of the spokes, and a brake arranged to press upon said disk and having means for operating it substantially as shown and described.

2. The combination with a bicycle-wheel having spokes which cross each other near the hub; of a brake-disk having a frictional grooved periphery and pairs of holes K coinciding with the crossed points of the spokes, wires or fastenings passing through these holes and around the crossed points of the spokes to rigidly and strongly connect the disk to the wheel, a brake-lever corresponding in cross-section to the groove of the disk, and means for operating it substantially as shown and described.

3. The combination with a bicycle-wheel; of a dished or concavo-convex disk having a peripheral groove and applied directly to the spokes of the wheel as described, a clip C embracing one of the fork branches of the frame and carrying a bar D inside the fork, a brake-lever A fulcrumed to said bar within the fork and having a cross-section corresponding to the groove of the disk, a spring J connecting the rear ends of the brake-lever and fulcrumed bar, and a connecting-rod and operating-lever extending to the handle of the bicycle substantially as and for the purpose described.

4. A brake-disk for a bicycle consisting of a sheet-metal disk dished as described and having tongues H stamped out of the sides of the disk and bent outwardly, and a grooved rim retained between the peripheral edge of the disk and the tongues substantially as and for the purpose described.

5. The combination with the bicycle-wheel having crossed spokes, a dished disk with peripheral grooves attached to the wheel at the crossed points of the spoke, a brake-lever fitting the groove of said disk and having a connecting-rod extending to the handle-bar and a compound lever mounted on the handle-bar and connected with the said connecting-rod substantially as and for the purpose described.

WILLIAM VALENTINE.
WILLIAM S. VALENTINE.

Witnesses:
JAS. W. PHILLIPS,
PETER F. PETERSEN.